May 6, 1941.  E. T. MEAKIN  2,240,660
EXTRUSION MILL
Filed Feb. 26, 1940  3 Sheets-Sheet 1
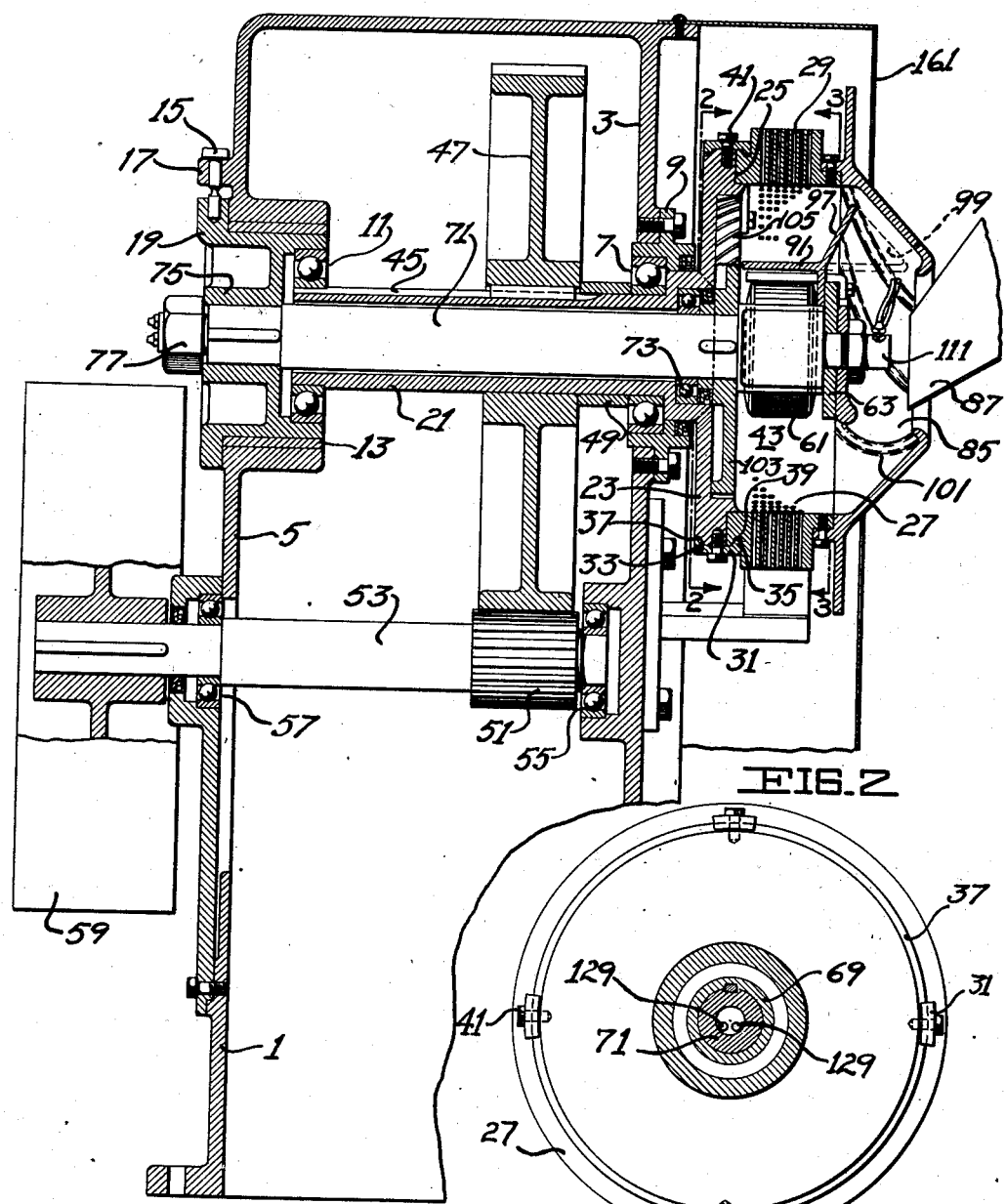
INVENTOR.
EDGAR T. MEAKIN
BY Charles O. Bruce
ATTORNEY.

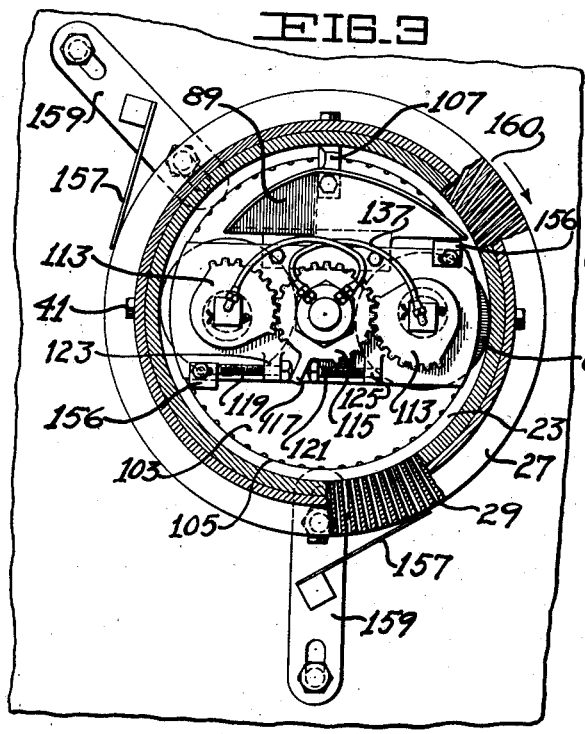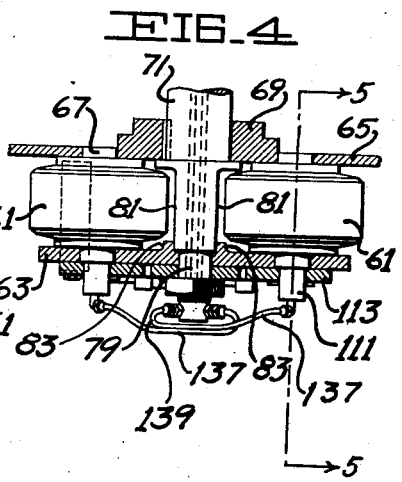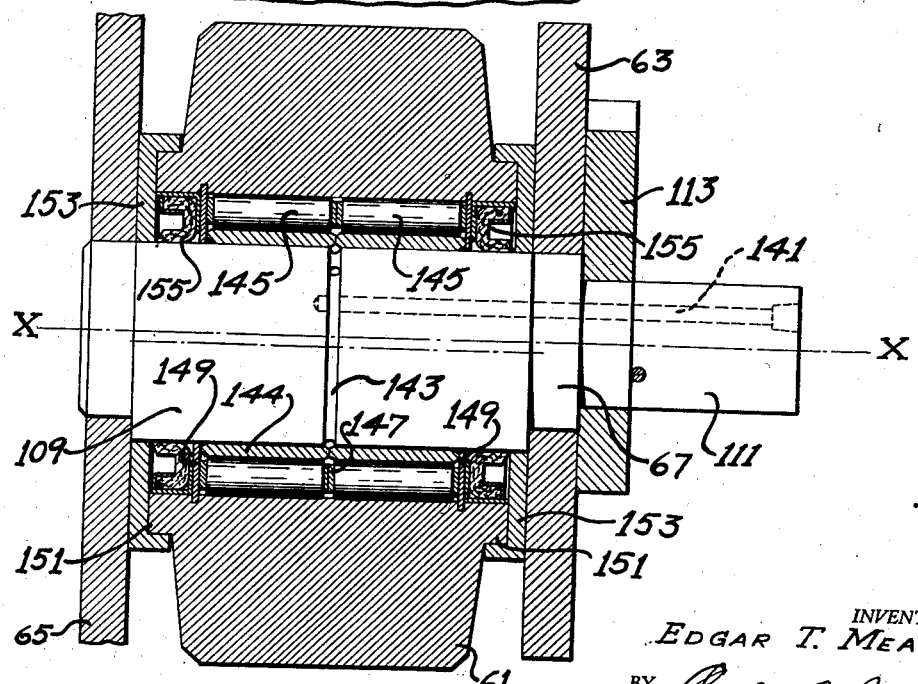

May 6, 1941.　　　　E. T. MEAKIN　　　　2,240,660
EXTRUSION MILL
Filed Feb. 26, 1940　　　　3 Sheets-Sheet 3
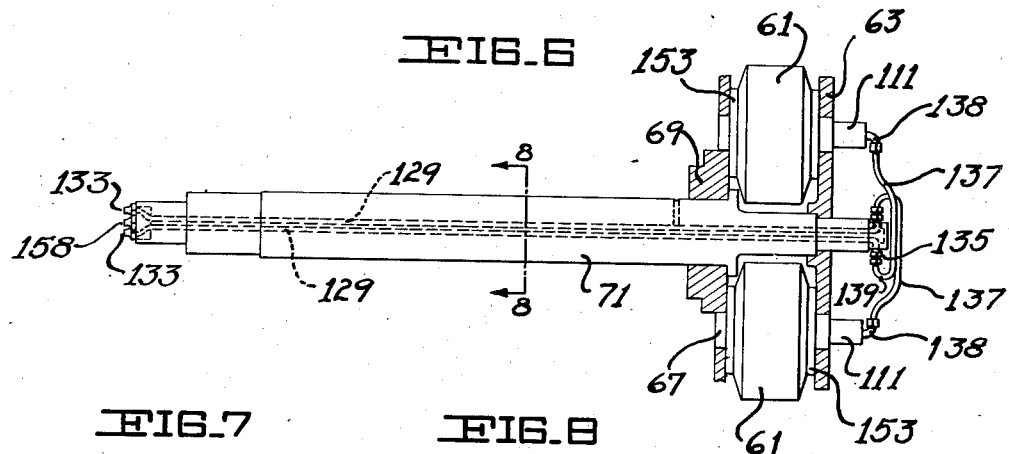
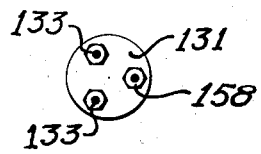 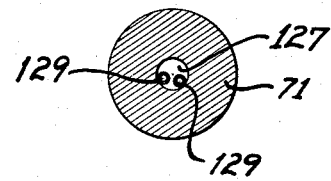
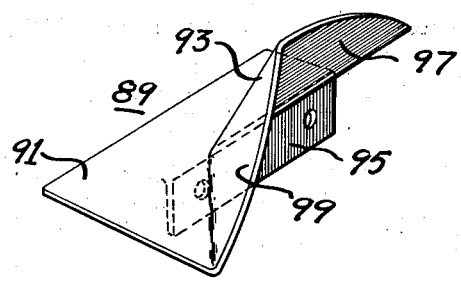
Inventor
EDGAR T. MEAKIN
Charles O. Bruce
Attorney Patented May 6, 1941

2,240,660

UNITED STATES PATENT OFFICE 2,240,660

EXTRUSION MILL

Edgar T. Meakin, San Francisco, Calif.

Application February 26, 1940, Serial No. 320,783

18 Claims. (Cl. 107—8)

Broadly, my invention relates to mills and in particular to mills of the extrusion type adapted for the formation of pellets from feed meal, minerals and other similar moldable materials.

The principal object of my invention is the provision of an efficient structure for the formation of pellets from granular materials.

Other objects of my invention are: To provide in an extrusion mill employing a die ring and pressure roller, means for varying the spacing between said die ring and roller; to provide in such a device, means whereby breakage of parts is obviated in event the extrusion members become jammed; to provide in an extrusion mill employing a die ring and a plurality of extrusion rollers, improved means for simultaneously adjusting the position of the rollers with reference to the die ring; to provide in such a structure, improved means for distributing material upon the face of the die for extrusion; to provide in an extrusion mill having a vertically positioned die ring and an extrusion roller, means for receiving and directing material toward the converging faces of the die ring and roller; to provide an extrusion mill wherein maximum extrusion is obtained with minimum power consumption; to provide in an extrusion mill means for efficiently precluding access of the material to the bearings and other portions of the machine where damage may otherwise result therefrom; to provide in an extrusion mill a highly satisfactory and efficient lubricating system, enabling lubrication servicing without shut down, and which will prevent contamination of the product of the mill with lubricant; and to provide an extrusion mill of simple but rugged construction.

The invention possesses numerous additional objects and features of advantage, some of which, together with the foregoing, will become apparent upon perusal of the following description of my invention. It is to be understood, however, that I do not limit myself to this disclosure of the species of my invention, as I may adopt variant embodiments thereof within the scope of the claims.

Referring to the drawings:

Figure 1 is a view in vertical section of an extrusion mill incorporating my invention.

Figure 2 is a sectional view through the sleeve and shaft of such structure, the plane in which the view is taken being indicated by the line 2—2 of Figure 1.

Figure 3 is a vertical sectional view, partly in elevation, of the apparatus shown in Figure 1, and is taken in the plane indicated by the line 3—3 of such figure.

Figure 4 is a sectional view of the roller support with the rollers and a portion of the supporting shaft shown in elevation.

Figure 5 is a sectional view, partly in elevation, of one of the rollers and its mounting, the view being taken in the plane indicated by the line 5—5 of Figure 4.

Figure 6 is a plan view of the rollers and mountings and particularly stressing the lubrication system of this assembly.

Figure 7 is a rear end view of the shaft of Figure 6.

Figure 8 is a cross sectional view taken in the plane 8—8 of Figure 6.

Figure 9 is a view in perspective of a feed guide element constituting an important feature of my improved mill.

In terms of broad inclusion, the structure of my invention comprises an annular perforated die ring and means preferably comprising rollers cooperative with the inner face of the die ring for extruding material through the perforations thereof upon relative movement between the die ring and rollers. Means is provided for causing such relative movement. Preferably, the die ring is rotated about the rollers, although it is within the scope of my invention to hold the die ring stationary and move the rollers around the inner face thereof. I prefer to support the die ring in a vertical position with the apertures or perforations thereof inclined at an angle with respect to the radii of the ring and in such manner as to incline toward the compression side of the rollers. Means responsive to a predetermined stress on the rollers or die ring, such as is likely to occur in jamming, is provided for permitting unitary movement of the rollers and die ring so as to prevent breakage of parts. Also, means, preferably comprising a funnel-shaped centrifugal feeder, is provided for distributing material against the inner face of the die ring, and means is supplied for receiving and directing a portion of such material toward the converging surfaces of the die ring and one of the rollers in the upper portion of the extrusion chamber. A lubrication system is incorporated into the mill which will enable the roller assembly, located at the front of the mill, to be lubricated from a point at the rear of the mill and remote from those portions of the machine which handle the material to be extruded, without shut down of the machine or contamination of the material with lubricant. As an added feature, I provide scraping means for precluding packing of the material in portions of the extrusion chamber where it ordinarily would strain the roller assembly and otherwise place an unproductive load on the machine. Plows may be provided for leveling the material upon the face of the die ring, and suitable knives are supplied for severing the extruded strings of material into predetermined lengths to form pellets.

Referring to the drawings for a more detailed description of a particular mill embodying my invention in its preferred form, the construction involves a casing 1 having a front wall 3 and rear wall 5, each of which carries a bearing assembly with the bearings in alignment. The front wall bearing assembly 7 is permanently bolted thereto through a peripheral flange 9. The rear wall bearing 11 is supported within a bearing sleeve 13 and is normally fixed against rotation by a shear pin 15 extending through a boss 17 on the rear wall and engaging a shear pin flange 19 forming part of the bearing assembly.

Supported for rotation in the aforementioned bearings is a main drive sleeve 21 which extends beyond the front wall 3 and terminating in a die supporting and driving disk 23. This driving disk has an edge recess 25 in the front face thereof adjacent its periphery to receive a cylindrical die 27 having radial die openings 29 therethrough. The die is rigidly held in position on the driving disk by a plurality of locking keys 31, each having an inwardly directed flange 33 and 35 along each side edge thereof to engage a circumferential edge groove 37 on the driving disk, and a circumferential groove 39 about the rim of the die. The locking keys are fixed in position by screws 41 applied therethrough and threading into the rim of the driving disk 23.

The die and driving disk assembly form a die chamber 43 which is rotable by reason of the sleeve extension 21 supported in the bearings 7 and 11. This sleeve is provided with a keyway 45, enabling a main drive gear 47 to be keyed thereto, the same being maintained in spaced relationship to the front bearing 7 by a spacing collar 49 surrounding the sleeve.

Power is transmitted to the main drive gear 47 through a pinion 51 carried by a pinion shaft 53 supported between the front and rear walls of the casing on bearing assemblies 55 and 57 carried thereby, such shaft being keyed to an external pulley 59 or other means for deriving power from some suitable prime mover, such as a motor or engine.

Located within the die chamber are a pair of extrusion rollers 61 for cooperating with the die in the extrusion of moldable material through the die openings. These rollers are mounted within a horizontally disposed cage comprising front and rear end plates 63 and 65 respectively, which serve to carry the spindles 67 about which the rollers revolve. The rear end plate has a thickened central portion 69 which is keyed to a shaft 71, which shaft in turn passes axially through the main drive sleeve 21. It is supported adjacent the front wall 3 in a bearing 73 carried within the sleeve 21 which has been enlarged at that point for the purpose. The end of the shaft remote from the roller assembly is supported in a central hub 75 constituting part of the rear wall bearing assembly 11, the shaft being keyed therein to prevent rotational movement of the shaft. The shaft extends slightly beyond this central hub to accommodate a tightening nut 77.

The front end plate 63 of the roller cage assembly is supported upon a reduced end 79 of the shaft in abutment against a shaft shoulder formed in the reduction of this end of the shaft on which the front end plate is mounted. Rigidity of assembly in the mounting of this front end plate is obtained by providing the abutted portion of the shaft with diametrically opposed flat surfaces 81 and engaging such flat surfaces with parallel transverse ribs 83 formed integrally with the end plate. The spacing of the rollers from the main shaft is normally sufficient to bring them into cooperative relationship with the die, and thus enabling them to function in their intended manner.

As thus far described, it will be noted that the roller assembly is fixed, while the die 27 is caused to rotate through the application of power to the main drive gear 47, thus bringing about the proper cooperation between the rollers and the die. It is of interest to note in this connection that, in as much as only the die is rotated, the apparatus is simplified to the extent that no provision need be made for establishing a drive connection to the roller assembly.

The material to be molded is fed through the open end of the die chamber 43 by way of a conical shaped distributor 85 which is peripherally mounted upon the front edge of the die 27 and is thus caused to rotate with the die during operation of the mill. This conical shaped distributor has a central opening therein to receive the discharge end of a feed spout 87. During rotation of the die and conical shaped distributor assembly, the material which is deposited upon the internal conical surface of the distributor, will, due to the effect of centrifugal force upon the material so deposited, be carried around by the distributor and traverse a spiral path as the material approaches the discharge edge of the distributor. The lower half of the die chamber, below the roller assembly, receives its share of the distributor output directly from the discharge edge of the distributor. This material is carried up by the die between the converging surfaces of the die and that roller toward which the lower die section moves, where it will be acted upon by such roller and extruded through the die openings. Such raising of the material by the die is aided by the centrifugal force imparted to the material in the rotation of the die.

To assure a plentiful supply of material to the upper portion of the die chamber, where it may be acted upon by the other roller of the assembly, I provide a feed guide 89 having the form illustrated in Figure 9. This feed guide comprises a floor section 91 and an upwardly directed flange 93, and has integrally formed therewith, a perforated depending mounting flange 95 for attaching the feed guide to the upper edge of the front end plate 63 of the roller cage. The upwardly directed flange is inclined toward and extends within the conical shaped distributor member 85, each point on the edge of this flange lying approximately in an imaginary cone surface concentric with the cone distributor and approaching closely adjacent thereto. A portion 97 of this flange has its edge equi-distant at all points from the base of the distributor, while another portion 99 thereof is directed inwardly toward the apex of this distributor member. In as much as its edge terminates closely adjacent the interior surface of the distributor member, as previously mentioned, the portion 99 will serve as a scraper and deflector for the material which is being carried upon the surface of the distributor member. Such material as is thus removed by the portion 99 is deflected thereby toward the converging surfaces of the die ring and the roller, and in this it is aided by the first portion 97 of the upwardly directed flange, which cooperates with the floor section 91 and the rear portion of the chamber to form a guide trough or pocket and prevent the material from spilling back into the conical distributor member and dropping down between the components of the roller assembly.

While the centrifugal force developed by the rotation of the distributing member 85 is sufficient to enable this member to function with a smooth interior surface, the lifting of the material by this distributor may be enhanced somewhat by providing the inner surface thereof with a plurality of spirally disposed ribs 101 or corresponding raised surfaces.

In as much as the material fed to the mill has a certain amount of abrasive characteristics which may do considerable damage to bearings and other sensitive parts of the machine, if continually exposed thereto, it becomes highly desirable to take every precaution in keeping the material from gaining access to these parts of the machine, and this is particularly true of the main bearing assemblies 9 and 73 of the machine under discussion. As a means for preventing the material, which is carried into the die chamber, from gaining access to these bearing assemblies, I make the rear end plate 65 into the form of a disk insert 103 in the front face of the driving disk 23. This disk insert has formed on its periphery a plurality of spiral ribs 105 which closely fit against the driving disk, yet permitting rotation of the driving disk with respect to this insert 103. In operation, material tending to filter through the grooves between the spiral ribs on the rim surface of this disk insert, will be precluded from passing therethrough by the action of the spiral ribs upon the moving material.

It has been found, in mills of the above general character wherein operation depends upon relative movement between a roller and a cylindrical die, that the material fed to the die chamber has a tendency to pack into the rear peripheral corner of the chamber to a substantial thickness, sufficient to subject the roller assembly to excessive axial strains and stresses and impede operation of the machine. I have completely eliminated this source of trouble by mounting a fixed scraper 107 to the disk insert and causing the same to slide over the exposed face portion of the die driving disk 23. With this scraper in position, the material is not given an opportunity to pack as has been the case previously.

After prolonged use of the machine, the rollers and the die begin to show signs of wear, resulting in too great a clearance between the rollers and the die, for proper extrusion operation. To compensate for this, I make the rollers adjustable with respect to the die, thus enabling them to be shifted closer to the die surface to take up for such wear. This I accomplish by making the roller supporting portion 109 of each spindle 67 of enlarged cross section and eccentric to the spindle axis x—x (Figure 5), and then provide means for angularly adjusting this eccentric portion of the spindle, whereby the axis of the roller may be shifted within limits sufficient to take care of any wear which might occur as a result of operation of the machine.

This adjustment is realized by providing each spindle with a short extension 111, carrying it through the front end plate 63, and mounting on this spindle extension a gear sector 113. These gear sectors are engaged by a common control and locking pinion 115 which is rotationally mounted on the reduced end 79 of the main shaft 71, and has an integral radially extending control finger 117. This control finger is locked in position between the heads of two adjusting screws 119 and 121 respectively, which are suitably threaded through bosses 123 and 125 respectively, formed on the front end plate of the roller cage assembly. In adjusting the rollers for wear, one of the adjusting screws is backed away from the locking gear finger in the direction it is desired to adjust, thus permitting the locking pinion to be rotated by following up with the other adjusting screw sufficiently to bring the rollers into proper cooperative engagement with the die. When the proper adjustment has been made, the first screw is then reversely rotated to bring it back into engagement with the locking gear finger to thereafter prevent accidental shifting of the adjusting mechanism.

In mills of the character above described, it is a very desirable thing to isolate the material under extrusion and the lubricant employed in maintaining the parts in proper working order. The desirability of keeping the material out of the bearings, in view of the abrasive character of such material, has already been commented on. In view of the fact that material to be extruded usually constitutes a feed for poultry or livestock, chemical mixtures or combinations, or any of a variety of other materials, it is just as desirable to prevent such material from becoming contaminated by any of the lubricant utilized in the machine. This presents quite a problem in connection with the design and development of mills of the type under consideration.

In the construction described by me above, the fact that the roller assembly and main shaft are maintained fixed and stationary, has enabled me to incorporate into the machine a lubricating system which will enable proper lubrication of the essential parts of the machine, and more particularly the roller assembly, as often as necessary, and what is quite important, without the necessity of shutting down the machine for such lubrication service. At the same time, the lubricating system satisfactorily solves the problem of realizing proper lubrication without any danger of the lubricant mixing with the feed material.

A longitudinal bore 127 is provided from the rear end of the main shaft 71 to a point just short of the front end thereof, and through this bore are extended a pair of lubrication feed lines 129. The rear end of the shaft is capped with a closure 131, and each of these lines 129 terminates in a fitting 133 mounted on the closure 131, and preferably of the type adapted to take a grease gun. At the front end, each of the lubrication feed lines is brought out from the shaft, radially, and terminates in a fitting 135 adapted for connection to an additional section 137 of line of a length sufficient to reach the extended end 111 of a roller spindle and allow for the incorporation of an expansion loop 139 therein.

The extended end 111 of each roller spindle is also provided with a fitting for effecting a connection to the free end of this lubrication feed line section 137, and constitutes the inlet end of a bore 141 which extends through the spindle from this fitting to approximately midway of the eccentric portion 109, where it connects radially to a circumferential groove 143 formed in this eccentric portion of the spindle.

The eccentric portion of the spindle is surrounded about the central portion thereof by a split roller bearing race 144 having bevelled edges to permit for flow and escape of lubricant. The bearing race is surrounded by two rows of roller bearings 145 spaced from each other by spacing rings 147, the bearing race and bearings being held in position about the eccentric portion of the spindle by retaining walls 149 which are fixed in the inner surface of the roller 61 and of sufficient width to engage the bearing surface of the eccentric portion of the spindle.

The roller is provided at each end with a short extension 151 of reduced diameter which rotatably fits into an end cap 153. These end caps are affixed to the eccentric portion of the spindle, thereby permitting relative rotation between the roller and such end caps. Annular spaces are formed in the roller between the retaining walls 149 and the end caps 153, in which are located suitable sealing rings 155 of any well known design or construction.

In order to lubricate the rollers, it will be noted that the oil or grease is applied at the rear end of the main shaft, which is remote from the roller assembly and outside of the extrusion chamber. From the point of application of the grease or oil and up to the bearing assembly within the roller, the lubricating system is entirely closed and sealed, leaving no room for escape of lubricant within the extrusion compartment, where it may contaminate the material under extrusion.

A radial bore through the wall of the shaft 71, at the location of the shaft bearing 7, enables lubrication of this bearing from within the shaft bore 127, and a fitting 158 is mounted on the shaft cap 131 for this purpose.

Prior to reaching the converging surfaces of the die and each roller, the material is intercepted by a plow 156 adjustably mounted on the front end plate 63, which functions to level out the material to a uniform thickness before extrusion, thus assuring uniformity in the extruded product in addition to a more efficient functioning of the machine.

The material, as it is extruded, is sliced off to proper length by a pair of severing knives 157, each supported upon an adjustable bracket 159, with the severing edge bearing against the outer surface of the die 27. While I have described the die openings 29 as being radial, it is within the contemplated scope of my invention to dispose these die openings with their axes such that the outlet end of each opening will trail the input end during rotation of the die, as is alternatively illustrated in a portion of Figure 3, at 160, and when such is the case, the severing edges of the knives will face the approaching trailing outlet openings of the die.

In the event, as it sometimes accidentally happens, foreign material, such as tramp iron, should find its way into the machine with the feed, it will be apparent that under such conditions, the rollers and die will be subjected to stresses way beyond those contemplated for normal operation, and which are very likely to cause considerable damage to either of these parts. The shear pin 15, previously described, will operate as a safety device to prevent damage to the rollers or die from such cause. The shear pin is provided with a reduced cross section intermediate the boss 17 and the shear pin flange 19, the reduction being such as to cause the pin to shear at this point when the stresses developed within the extruding compartment begins to approach a value which is apt to result in damage to the machine. Upon such shearing of the pin, the rear wall bearing assembly is no longer fixed against rotation, thereby permitting the roller assembly to revolve along with the die, and in this manner the elements within the extrusion chamber are relieved of all stress. After the troublesome condition has been remedied, the roller assembly can be rotated to its fixed horizontal operative position, and a new shear pin can be inserted, to again fix the rear wall bearing assembly and the roller assembly against rotation.

A thin wall casing 161 surrounding the extrusion chamber and enclosing a portion of the cone distributor member, terminates below the extrusion chamber in a discharge hopper (not illustrated) for collecting the material as it is extruded and severed from the die.

It will be apparent from the above detailed description of a preferred form of my invention, that it will fulfill all the objects of my invention, as previously expressed. While I have described the same in detail, my invention is subject to various changes and embodiments, without departing from the principles thereof, and I accordingly do not desire to be limited in my protection to such details of construction as above described, except as may be necessitated by the prior art and the appended claims.

I claim:

1. In an extrusion mill of the class described, a perforated die ring, means for supporting said die ring, a plurality of spindles spaced from a face of said die ring and each having a bearing surface eccentric to the axis of the spindle, a roller rotatable on each said bearing surface and cooperative with said die ring for compressing and forcing material through the perforations thereof upon relative movement between said die ring and said roller, means for causing said relative movement, and means for simultaneously adjusting said spindles angularly, each about its own axis, to vary the rotating positions of said rollers with respect to said die ring.

2. In an extrusion mill of the class described, a perforated ring member, an extrusion member disposed adjacent the inner face of said ring member and adapted to compress and force material through the perforations thereof upon rotation of said ring member, means for normally supporting said extrusion member in a fixed position, means for rotating said ring member, and means responsive to a predetermined stress on said extrusion member for releasing said supporting means whereby said extrusion member is free to move with said ring member.

3. In an extrusion mill of the class described, a frame, a sleeve mounted for rotation in said frame, a perforated die ring carried by and rotatable with said sleeve, a shaft disposed longitudinally of said sleeve, a roller carried by one end of said shaft and disposed for cooperation with the inner face of said die ring for extruding material through the perforations thereof upon rotation of said die ring, a bearing block journaled for rotation in said frame and supporting the other end of said shaft, means connected with said frame for normally preventing rotation of said bearing block, said means being responsive to a predetermined stress on said shaft for releasing said bearing block for rotation, and means for rotating said sleeve and die ring.

4. In an extrusion mill of the class described, a perforated die ring, means supporting said die ring with its axis substantially horizontal, extrusion means disposed adjacent the inner face of said die ring for compressing and forcing material through the perforations thereof upon relative movement between said die ring and extrusion means, means for causing said relative movement, and material guide means comprising a funnel-shaped member having its larger end substantially spanning one end of said die ring and its smaller end adapted to receive material for distribution through said funnel-shaped member toward the inner face of said die ring.

5. In an extrusion mill of the class described, a perforated die ring, means supporting said die ring with its axis substantially horizontal, extrusion means disposed adjacent the inner face of said die ring for compressing and forcing material through the perforations thereof upon relative movement between said die ring and extrusion means, means for causing said relative movement, rotatable means comprising a funnel-shaped member having its larger end substantially spanning one end of said die ring and its smaller end adapted to receive material for distribution through said funnel-shaped member toward the inner face of said die ring, means supported within the upper half of said die for receiving material from said funnel-shaped member and directing it toward the pocket formed between said die and said extension means, said material receiving and directing means including a guide surface extending from within said funnel-shaped member to a point above said extrusion means.

6. In an extrusion mill of the class described, a perforated die ring, means supporting said die ring with its axis substantially horizontal, extrusion means disposed adjacent the inner face of said die ring and adapted to extrude material through the perforations thereof upon rotation of said die ring, means for rotating said die ring, material guide means comprising a conical-shaped member having its larger end substantially overlying one end of said die ring and adapted to urge material received thereby toward the inner periphery of said die ring upon rotation of said guide means, means for mounting said guide means for rotation with said die ring, means supported within the upper half of said die for receiving material from said conical-shaped member and directing it toward the pocket formed between said die and said extrusion means, said material receiving and directing means including a guide surface extending from within said conical-shaped member to a point above said extrusion means.

7. In an extrusion mill of the class described, a perforated die ring, extrusion means disposed adjacent the inner face of said die ring and adapted to extrude material through the perforations thereof upon rotation of said die ring, means for rotating said die ring, and rotatable means comprising a conical-shaped member overlying one end of said die ring for distributing received material toward the inner face of said die ring, said conical-shaped member having ribs rising above the inner surface thereof for enhancing the distribution of said received material.

8. In an extrusion mill of the class described, a vertically positioned perforated die ring, a roller cooperative with the inner face of said die ring for extruding material through the perforations thereof upon rotation of said die ring, means for centrifugally distributing material toward the inner face of said die ring, and means disposed adjacent the inner face of said die ring and having a surface adapted to receive a portion of said material and direct the same toward the converging faces of said die ring and roller.

9. In an extrusion mill of the class described, a vertically positioned perforated die ring, a pair of rollers fixedly disposed in a horizontal plane within said die ring and adapted to compress and force material through the perforations thereof upon rotation of said die ring, means for rotating said die ring, means for receiving and distributing material toward the lower portion of the inner face of said die ring, and means for collecting from said last means a portion of such received material and guiding the same toward the converging surfaces of one of said rollers and said die ring.

10. In an extrusion mill, an extrusion chamber bounded at least in part by an extrusion die, a shaft extending into said extrusion chamber, a rotatable extrusion member having a bearing and supported adjacent the chamber end of said shaft in cooperative relation to said die and in radial offset relationship to said shaft, said shaft having a conveniently accessible end beyond said chamber and remote from said extrusion member, and a lubricating system for said extrusion member extending longitudinally through said shaft from said remote end thereof and including a lubrication feed line from said shaft to the bearing of said rotatable extrusion member.

11. In an extrusion mill, an extrusion chamber bounded at least in part by a cylindrical die, a fixed shaft extending into said chamber, an extrusion roller supported by and adjacent the chamber end of said fixed shaft but spaced radially therefrom, said shaft having its other end conveniently accessible and remote from said roller, and a lubricating system for said roller extending longitudinally through said shaft from said remote end and including a lubrication feed line from the chamber end of said shaft to said roller, said feed line having an expansion loop therein.

12. In an extrusion mill, an extrusion chamber bounded at least in part by a cylindrical die, a hollow shaft extending into said chamber, a pair of extrusion rollers supported by and adjacent the chamber end of said hollow shaft but spaced radially therefrom, said shaft having its other end conveniently accessible and remote from said roller, and a lubricating system for said rollers comprising a pair of lubrication feed lines extending longitudinally through said shaft from said remote end, each of said feed lines emerging from the chamber end of said shaft and connecting to one of said rollers.

13. In an extrusion mill, a casing having spaced parallel walls, a sleeve rotatably supported in a horizontal position between said walls, an extrusion chamber carried adjacent one end of said sleeve and including a die, a shaft extending longitudinally through said sleeve into said extrusion chamber and supported independently of said sleeve at least at one end for enabling rotation of said sleeve relative to said shaft, an extrusion member carried by the chamber end of said shaft in cooperative relationship with said die, and means for rotating said sleeve to the exclusion of said shaft.

14. In an extrusion mill, an extrusion chamber including a die, extrusion means adapted to extrude moldable material through said die upon relative movement between said die and said extrusion means and disposed adjacent to but out of contact with a wall of said chamber which is normal to the surface of said die, and scraping means disposed more closely adjacent said wall than said extrusion means and movable over the surface of said wall in response to relative motion between said extrusion means and said die to preclude packing of such material between said wall and said extrusion means.

15. In an extrusion mill, an extrusion chamber including a cylindrical die and a vertical end wall, an extrusion roller supported adjacent to but out of contact with said end wall and in operative engagement with said die, means for rotating said chamber with respect to said roller, and means for precluding packing of material between said end wall and the adjacent side wall of said roller comprising a scraper supported ahead of said roller and in substantially scraping engagement with said end wall, whereby increments of said end wall will be scraped before passing said roller.

16. In a machine for the extrusion of material through a die, a horizontally disposed chamber formed at least in part by a circular die and having an end wall, a pair of extrusion members fixedly supported on a common horizontal axis within said chamber and in extrusion relationship to said circular die, means for rotating said die and means for feeding moldable material into said chamber through a substantially central opening in said end wall.

17. In an extrusion mill, a die of the cylindrical type, a plurality of rollers, a plurality of spindles, each supporting a roller on an axis offset with respect to the axis of said spindle and in working engagement with a surface of said die, a gear sector associated with each of said spindles, and a pinion common to said gear sectors and meshing therewith to enable simultaneous and corresponding angular rotation of said gear sectors through adjustment of said pinion whereby to obtain simultaneous and corresponding adjustment of said rollers with respect to said surface of the die.

18. In an extrusion mill, a cylindrical type die, a plurality of spindles supported within said die at substantially the same radial distance from the internal compression surface of said die, each of said spindles having an offset associated therewith, and capable of being rotated through an arc about the axis of such spindle, a roller mounted for rotation about each of said offsets and in extrusion relationship with the internal surface of said die, a gear sector mounted on each of said spindles and adapted to move said offset along such arc in accordance with angular rotation of said gear sector, a gear lying intermediate said plurality of gear sectors and in meshing engagement with the same, and means for rotating said intermediate gear to simultaneously move said gear sectors through an angle sufficient to adjust the extrusion relationship of said rollers with respect to said die.

EDGAR T. MEAKIN.